(12) United States Patent
Wolf et al.

(10) Patent No.: US 6,443,544 B1
(45) Date of Patent: Sep. 3, 2002

(54) SLIDABLE DRAWER FOR UTILITY VEHICLE

(75) Inventors: Robert J. Wolf, Chariton, IA (US); Jack D. Brannan, Columbia, MO (US)

(73) Assignee: Astoria Industries of Iowa, Inc., Chariton, IA (US)

( * ) Notice: Subject to any disclaimer, the term of this patent is extended or adjusted under 35 U.S.C. 154(b) by 0 days.

(21) Appl. No.: 09/576,451

(22) Filed: May 23, 2000

(51) Int. Cl.⁷ ............................................. A47B 88/20
(52) U.S. Cl. ............................ 312/348.1; 312/348.2; 312/348.3; 312/263; 312/334.6
(58) Field of Search ................................ 312/263, 264, 312/265, 265.6, 257.1, 294, 318, 330.1, 334.1, 334.6, 334.27, 348.3, 348.1, 349, 350, 348.2

(56) References Cited

U.S. PATENT DOCUMENTS

| | | | |
|---|---|---|---|
| 4,249,684 A | 2/1981 | Miller et al. .............. 224/42.4 |
| 4,277,122 A * | 7/1981 | Bargiel ................... 312/263 X |
| 5,044,682 A | 9/1991 | Wayne ..................... 296/39.2 |
| 5,213,403 A * | 5/1993 | Lautenschlager .... 312/330.1 X |
| 5,265,993 A | 11/1993 | Wayne ....................... 410/129 |
| 5,526,972 A | 6/1996 | Frazier et al. .............. 224/539 |
| 5,597,193 A | 1/1997 | Conner ...................... 296/37.6 |
| 5,603,439 A | 2/1997 | Pineda ....................... 224/403 |
| D397,322 S | 8/1998 | Tobin ........................ D12/414 |
| 5,931,632 A | 8/1999 | Dongilli et al. ............. 414/522 |
| 5,979,725 A | 11/1999 | Lehrman .................... 224/539 |
| 6,131,981 A * | 10/2000 | Finley ................. 312/348.3 X |

* cited by examiner

*Primary Examiner*—John G. Weiss
*Assistant Examiner*—Michael J. Fisher

(57) ABSTRACT

A slidable drawer compartment has parallel side members with elongated bores on the bottom edge therein to slidably receive a support rail. A horizontal slot on the inner side of the side member extends the full length of the side member. The edges of a bottom member are received in the horizontal slot. Also, the inner sides of the side members have vertical slots at each end of the side members that dwell in a substantially vertical plane. A pair of panels are received in the vertical slots of the side members engaging the ends of the bottom member to close the compartment.

20 Claims, 5 Drawing Sheets

SLIDABLE DRAWER FOR UTILITY VEHICLE

BACKGROUND OF THE INVENTION

The present invention relates to a slidable drawer and more particularly, a slidable drawer for use with utility vehicles.

Slidable drawers are well known in the prior art and consist of familiar structural configurations developed to fulfill various objectives and requirements. For use with utility trucks, storage drawers have been constructed of aluminum with extensions that served as rails upon which the drawer would slide. Because drawers in a utility vehicle often store a variety of metal objects, which can be heavy, the conventional aluminum drawers have had sufficient strength and stiffness to safely retain the heavy metal objects. The problem with the aluminum drawers is that because they likewise are made of metal they are heavy and can limit the number of drawers that can be supported by a utility vehicle. Therefore, a need exists in the art for a lightweight drawer with sufficient strength and stiffness to safely retain a variety of heavy objects.

In view of the foregoing disadvantages inherent in conventional drawers, the primary object of this invention is to provide drawer made of a lightweight material that is also strong and stiff.

Another object of the present invention is to provide a drawer that is both economical to manufacture and easy to construct.

Another object of the present invention is to provide a drawer made with fewer parts.

These and other objectives will become apparent from the following description of the invention.

SUMMARY OF THE INVENTION

The present invention substantially departs from the conventional concepts and designs of the prior art, and in so doing has a configuration that allows a lightweight material to have sufficient strength and stiffness. The slidable drawer compartment has parallel side members with elongated bores on the bottom edge of the side members to slidably receive a support rail. On the inner side of the side member is a horizontal slot that extends the full length of the side member. Also, on the inner side of the side member are a pair of vertical slots at each end of the side members that dwell in a plane substantially coextensive with a vertical plane. The edges of a horizontal bottom member are received in the horizontal slots of the side member and a pair of panels are received in the vertical slots of the side members engaging the ends of the bottom member to close the compartment.

DETAILED DESCRIPTION OF THE INVENTION

Figure 1:
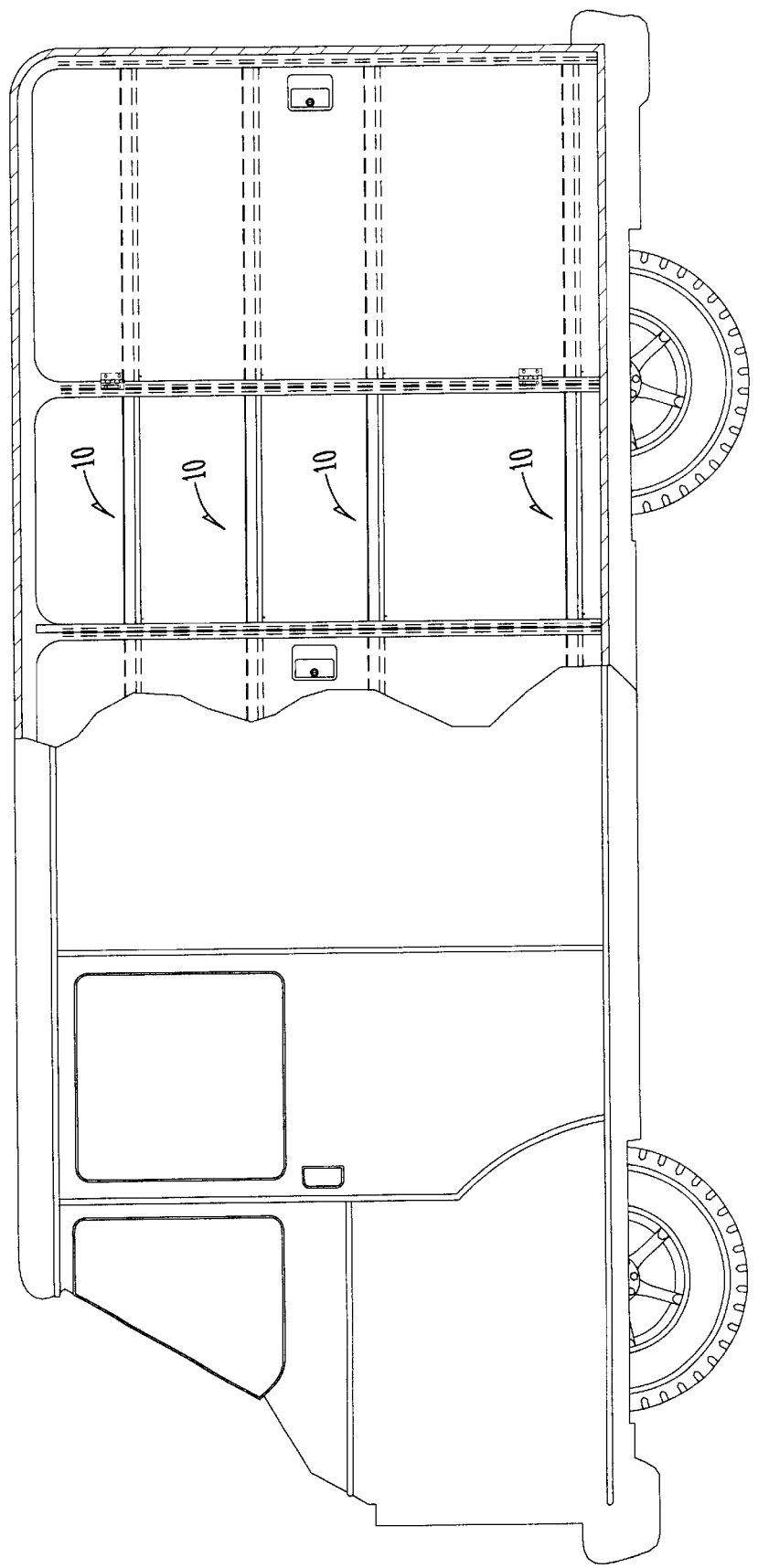
FIG. 1 is a side view of the invention mounted in a utility vehicle.
Figure 2:
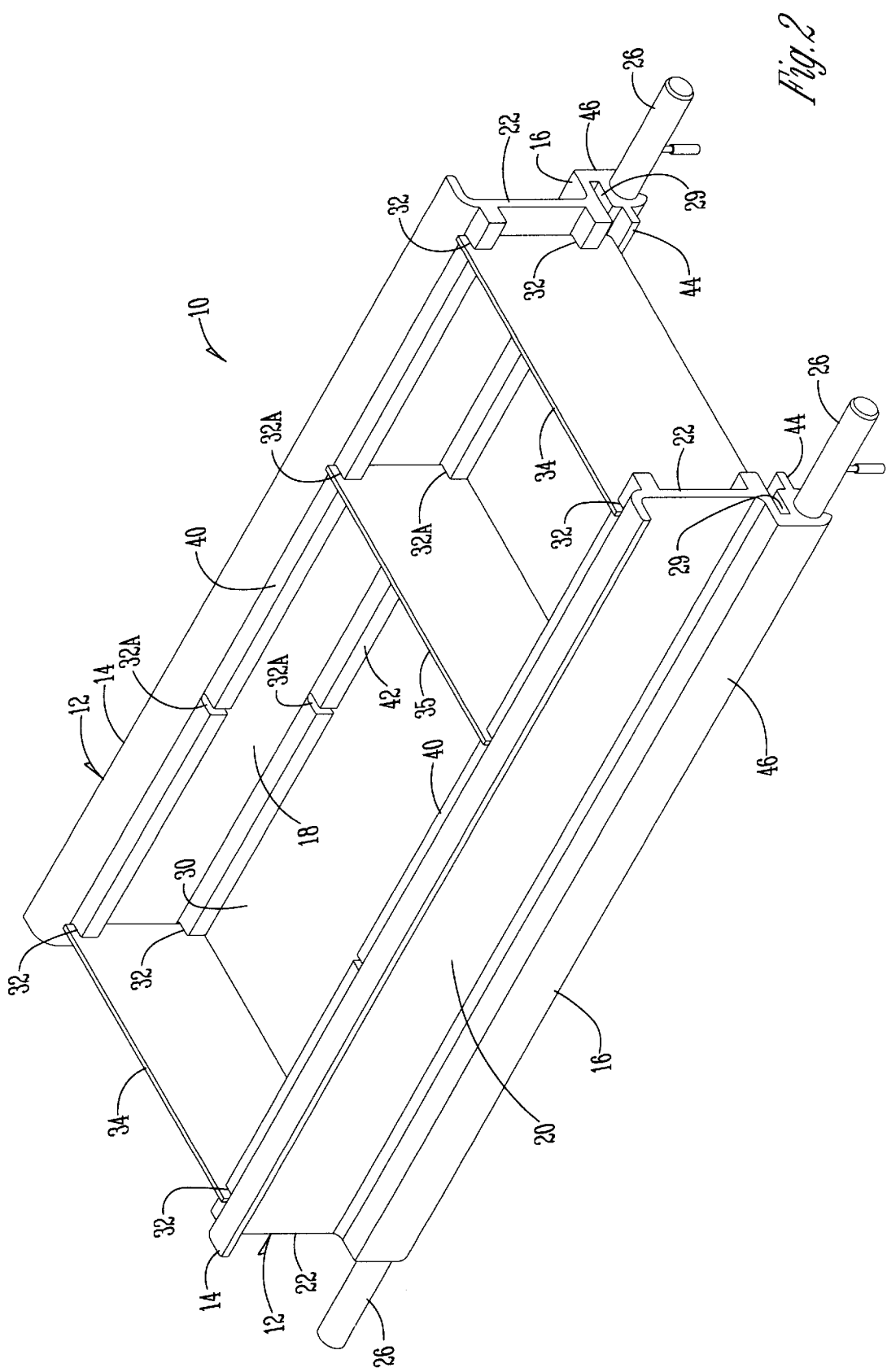
FIG. 2 is a perspective view of the invention.
Figure 3:
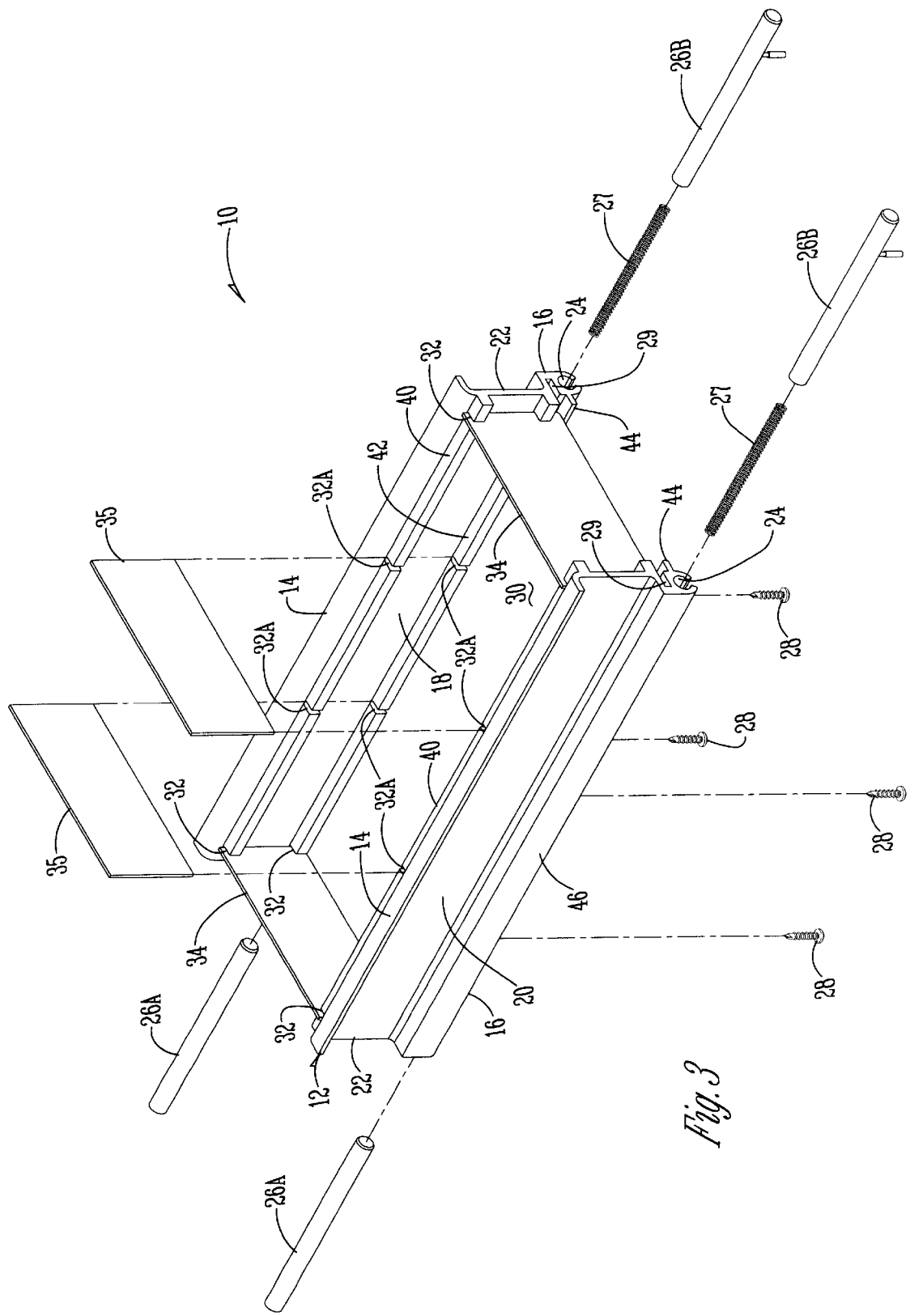
FIG. 3 is an exploded perspective view of the invention.
Figure 4:
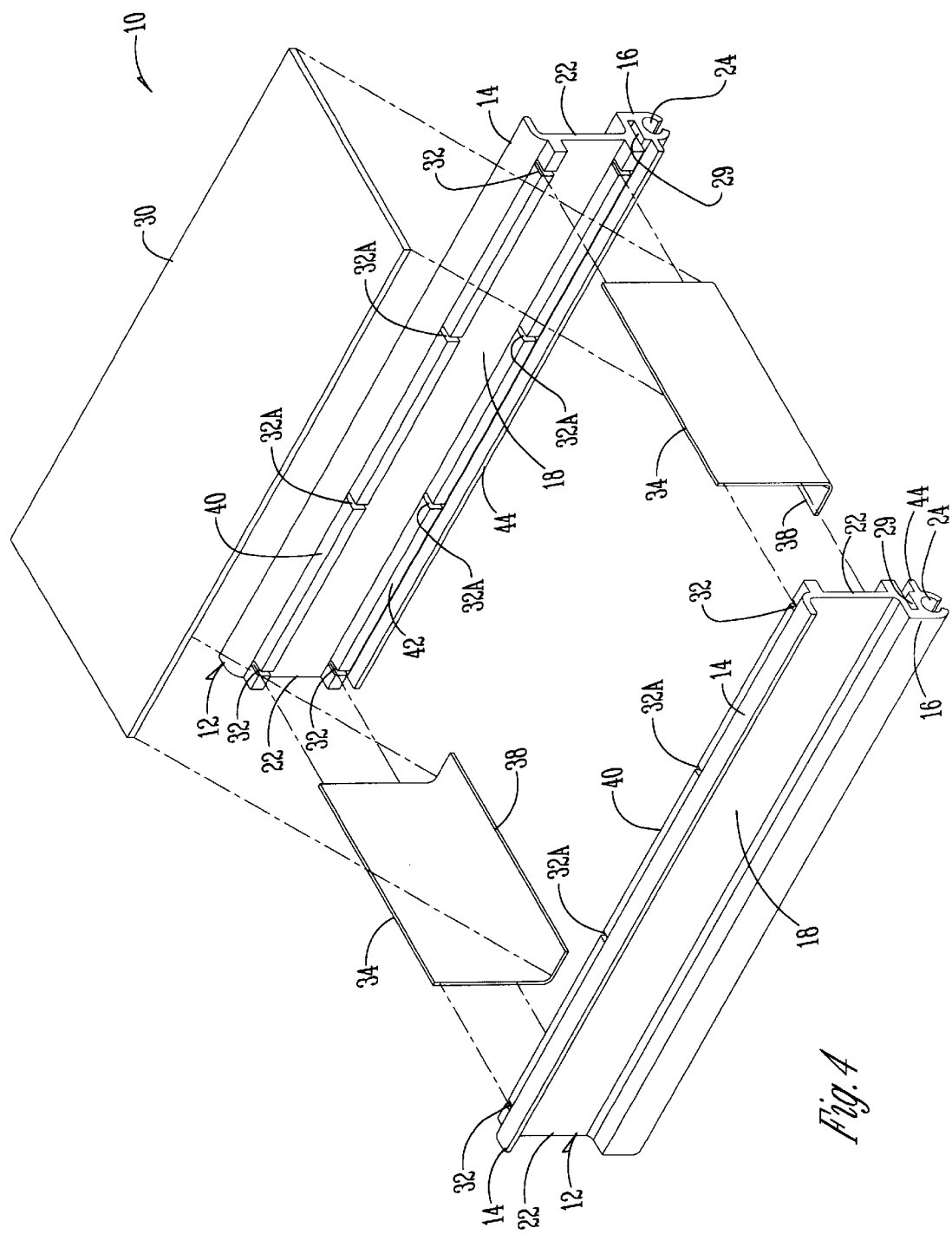
FIG. 4 is an exploded perspective view of the invention.
Figure 5:
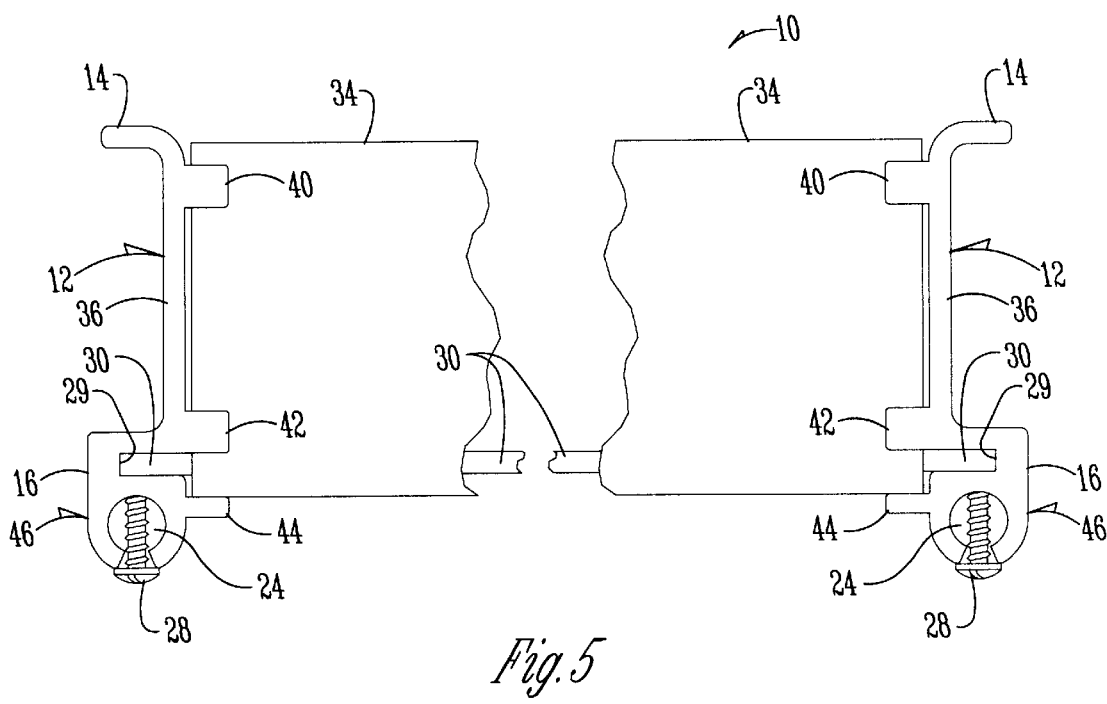
FIG. 5 is an end view of the invention.

The slidable drawer compartment of the present invention is generally designated by the reference numeral 10 in the drawings. The drawer 10 has a pair of parallel spaced side members 12 that have top 14 and bottom 16 edges, inner 18 and outer 20 sides, and opposite ends 22. Each bottom edge 16 of the side members 12 has an elongated bore 24 for slidably receiving a supporting rail 26. The rail 26 can be of any conventional configuration, but in one embodiment is comprised of a fixed pin 26A and a loaded pin 26B. The loaded pin 26B is loaded by the force of a spring 27. The pins 26A, 26B are received in the bore 24 and are restricted by screws 28 threaded into the bottom edges 16 of the side members 12. In this embodiment, the drawer 10 functions as an adjustable shelf where the fixed pin 26A and the loaded pin 26B are received by a plurality of holes in a support structure (not shown).

The side members 12 also have a horizontal slot 29 on the inner sides 18 of the bottom edges 16. The horizontal slot 29 extends the full length of the side members 12. The horizontal slots 29 receive the side edges of a bottom member 30 and hold the side members 12 in parallel relation.

A pair of vertical slots 32 on the inner sides 18 of the side members 12 are positioned at each end 22 of the side members 12 and dwell in a plane substantially coextensive with a vertical plane including the ends of the bottom member 30. The vertical slots 32 receive the side edges of panels 34 and the panels 34 engage the ends of the bottom member 30, to close the compartment. In an alternative embodiment, vertical divider slots 32A on the inner sides 18 of the side members 12 are positioned inwardly from each end 22 of the side members 12 and dwell in a substantially vertical plane. The divider slots 32A receive the side edges of divider panels 35 that serve to break the compartment 10 into subcompartments.

As can be seen, a drawer 10 of any size can be made simply by judicious selection of sizes for the side members 12, the bottom member 30, and the panels 34. While these elements are not restricted by any specific shape, U-shape side members 12 having vertically disposed web members 36, and L-shaped flanges 38 extending from the panels 34 are preferred. The L-shaped flanges 38 extend under the bottom member 30 to provide support. Further, while the compartment can be constructed of any conventional plastic material, fiberglass is preferred.

The side members 12, bottom member 30, and panels can be secured by any conventional means, but it is preferred that they are held together with epoxy, using large rubber bands as a clamping medium until dry.

In an alternative embodiment, the side members 12 have a pair of inwardly extending spaced upper 40 and lower 42 bars. The vertical slots 32 are vertically spaced in each end of the bars 40, 42 and dwell in a plane substantially coextensive with a vertical plane including the ends of the bottom member 30. The vertical slots 32 receive the side edges of the panels 34.

In a further embodiment a flange 44 extends inwardly from the bottom edges 16 of the side members 12. The flanges 44 are positioned such that the bottom edge of the panels 34 rest upon the flanges 44 thus providing additional support for the panels 34.

In still a further embodiment, elongated shoulders 46 extend along the bottom edges 22 of the side members 12 and extend outwardly thereof. The bores 24 are located within the shoulders 46 so that the center of the bores 24 lie in a plane outside of a plane passing through the web member 36 of the side member 12.

The preferred embodiment of the present invention has been set forth in the drawings, specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A slidable drawer structure having a compartment with opposite sides and ends comprising:

a pair of parallel spaced side members having top and bottom edges, inner and outer sides, and opposite ends;

each bottom edge of the side member having an elongated bore therein for slidably receiving a supporting rail and an elongated horizontal slot extending the full length of the side member;

a horizontal bottom member having opposite ends and opposite side edges received within the horizontal slot of the side members;

a pair of vertical slots on the inner sides of the side members at each end of the side members and dwelling in a substantially vertical plane including the ends of the bottom member; and front and rear panels having side edges extending into the vertical slots of the side members engaging the ends of the bottom member to close the compartment.

2. The device of claim 1 wherein the side members are one piece cast construction.

3. The device of claim 1 wherein the side members having a U-shape and include a vertically disposed web member.

4. The device of claim 3 wherein elongated shoulders extend along the bottom edge of the side members and extend outwardly thereof, the bores being located within the shoulders so that the center of the bore lies in a vertical plane outside of a vertical plane passing through the web member.

5. The device of claim 1 wherein the front and rear panels have an L-shaped flange.

6. The device of claim 5 wherein the L-shaped flange extends under the bottom member.

7. A slidable drawer structure having a compartment with opposite sides and ends comprising:

a pair of parallel spaced side members having top and bottom edges, inner and outer sides, and opposite ends;

each bottom edge of the side member having an elongated bore therein for slidably receiving a supporting rail and an elongated horizontal slot extending the full length of the side member;

a horizontal bottom member having opposite ends and opposite side edges received within the horizontal slot of the side members;

a pair of inwardly extending spaced upper and lower bars on each of the side members;

a pair of upper and lower vertical slots vertically spaced in each end of the bars of each of the side members and dwelling in a substantially vertical plane including the ends of the bottom member; and front and rear panels having side edges extending into the vertical slots of the side members engaging the ends of the bottom member to close the compartment.

8. The device of claim 7 wherein the side members are one piece cast construction.

9. The device of claim 7 wherein a flange extends horizontally inwardly from the side members and supports the front and rear panels.

10. The device of claim 7 wherein the side members are U-shaped, and include a vertically disposed web member.

11. The device of claim 10 wherein elongated shoulders extend along the bottom edge of the side members and extend outwardly thereof, the bores being located within the shoulders so that the center of the bore lies in a vertical plane outside of a vertical plane passing through the web member.

12. The device of claim 7 wherein the front and rear panels have an L-shaped flange.

13. The device of claim 12 wherein the L-shaped flange extends under the bottom member.

14. A shelf structure having a compartment with opposite sides and ends comprising:

a pair of parallel spaced side members having top and bottom edges, inner and outer sides, and opposite ends;

each bottom edge of the side member having an elongated bore therein for receiving a supporting rail and an elongated horizontal slot extending the full length of the side member;

a horizontal bottom member having opposite ends and opposite side edges received within the horizontal slot of the side members;

a pair of inwardly extending spaced upper and lower bars on each of the side members;

a pair of upper and lower vertical slots vertically spaced in each end of the bars of each of the side members and dwelling in a substantially vertical plane including the ends of the bottom member; and front and rear panels having side edges extending into the vertical slots of the side members engaging the ends of the bottom member to close the compartment.

15. The device of claim 14 wherein the side members are one piece cast construction.

16. The device of claim 14 wherein a flange extends horizontally inwardly from the side members and supports the front and rear panels.

17. The device of claim 14 wherein the side members are U-shaped, and include a vertically disposed web member.

18. The device of claim 14 wherein elongated shoulders extend along the bottom edge of the side members and extend outwardly thereof, the bores being located within the shoulders so that the center of the bore lies in a vertical plane outside of a vertical plane passing through the web member.

19. The device of claim 14 wherein the front and rear panels have an L-shaped flange.

20. The device of claim 19 wherein the L-shaped flange extends under the bottom member.

* * * * *